Aug. 9, 1955  E. H. PRYDE  2,715,057
CATALYZED REACTION BETWEEN METALLIC HYDRIDES AND BORIC OXIDE
Filed May 2, 1952
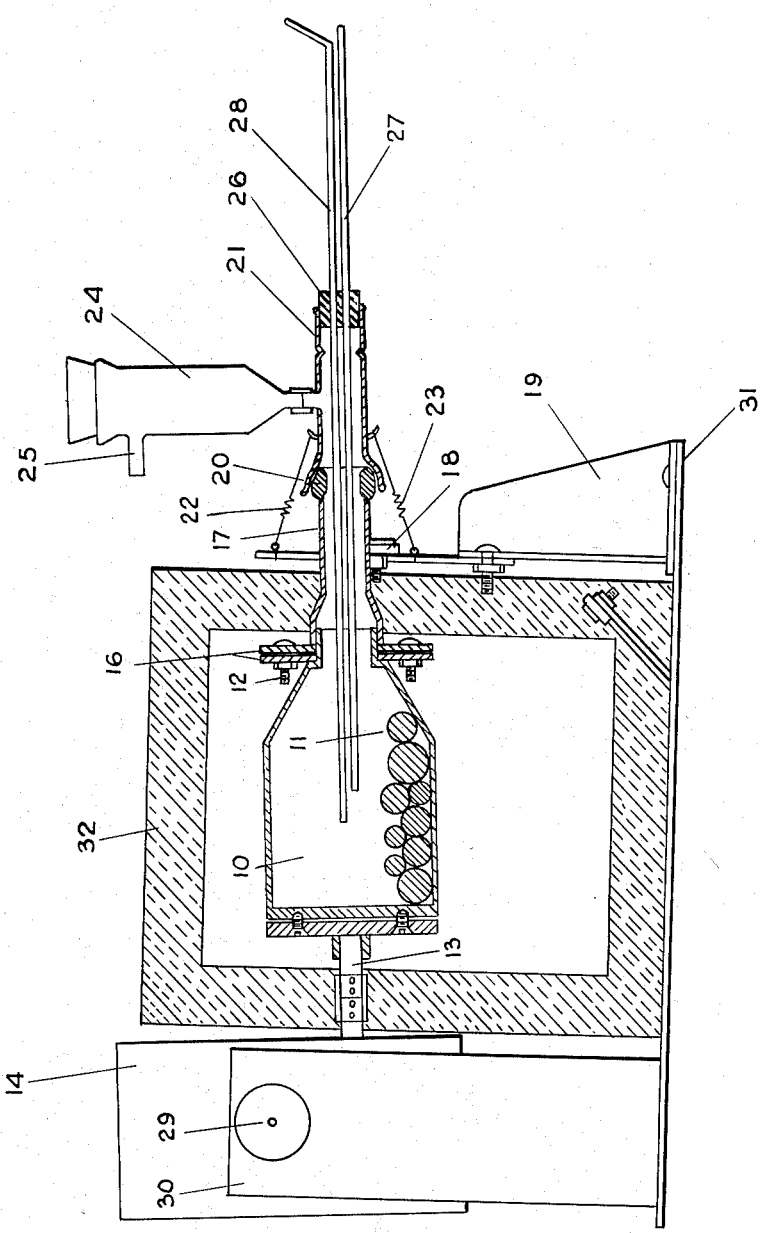
INVENTOR.
EVERETT H. PRYDE
BY James H. Ryan
ATTORNEY

United States Patent Office 2,715,057
Patented Aug. 9, 1955

2,715,057

CATALYZED REACTION BETWEEN METALLIC HYDRIDES AND BORIC OXIDE

Everett H. Pryde, Kenmore, N. Y., assignor to E. I. du Pont de Nemours and Company, Wilmington, Del., a corporation of Delaware Application May 2, 1952, Serial No. 285,772

14 Claims. (Cl. 23—14)

This invention relates to the borohydrides of alkali and alkaline earth metals and more particularly to the production of such borohydrides by interaction between boric oxide or anhydride and the hydride of the metal.

U. S. Patent 2,534,533 to Schlesinger and Brown discloses the reaction between a metallic hydride and boric oxide to produce the borohydride of the metal. The only illustration of the reaction shown by the inventors may be represented by the equation:

$$4NaH + 2B_2O_3 \rightarrow NaBH_4 + 3NaBO_2$$

The primary conditions shown by the patent as desirable in carrying out this reaction are a temperature of about 300–375° C. and a reaction time or 46 hours or more. The equation set forth is however apparently based on research disclosed in more detail in the "Final Report to the Signal Corps Ground Signal Agency on Contract W. 3434-sc-174" by H. I. Schlesinger, P. B. 6331. The final report states that a yield of 64% was obtained in 46 hours in glass vessels but that no borohydride could be produced in iron or steel vessels (page 8). Since glass apparatus is noticeably attacked by the reactants, inability to utilize ferrous materials constitutes a disadvantage it is desirable to overcome.

A primary object of the present invention is therefore generally to improve the process of Patent 2,534,533. A second object is, specifically, to reduce the time required to obtain suitable yields of borohydrides by the reaction between a metal hydride and boric oxide. Another object is to reduce the temperature required for the reaction. A further object of the invention is to develop a method for carrying out the reaction in iron or steel containers. Still further objects of my invention will be evident from the remainder of this specification and from the drawing in which:

The figure shows, partly in elevation and partly in section, a stainless steel ball mill found convenient as a reactor for my process.

An expedient which has been found of great value in improving the patented procedure and which essentially constitutes my invention is use of a catalyst. In the preferred embodiment of the invention the hydride of an alkali or alkaline earth metal is powdered and intimately mixed with approximately stoichiometric quantities of boric anhydride calculated on the basis of equations analogous with that shown above and additionally with a catalyst consisting of an alkoxide of the metal found in the hydride. Specific illustrations of operable metals are sodium and calcium while satisfactory catalysts are sodium and calcuim methoxides, respectively. The invention is however not to be understood as restricted either to these metals or to the methoxides, embracing on the one hand other alkali and alkaline earth metals such as lithium, potassium and barium and on the other hand such alkoxides as the ethylates, propylates, phenates and the like.

An additional expedient found of especial value to the instant process is thorough agitation of the reactants. Agitation prevents undesirable caking of solid materials and permits the reaction to proceed further towards completion than it otherwise would. While any conventional agitation means may be employed, a ball mill has been found particularly advantageous since it comminutes and stirs the solid reactants at one and the same time. A mill suitable for the purposes of this invention is substantially that described in "Industrial and Engineering Chemistry," 43, 1759–1766 (1951) particularly at page 1764 and illustrated in the appended figure.

The figure of this case shows a stainless steel reactor 10 containing steel balls 11 and supported by bolts 12 and shaft 13. Shaft 13 is rotatably connected to air motor 14 through appropriate gearing, not shown. Careful machining at flanges 16 permits gas tight connections to be made between reactor 10 and tube 17. Tube 17, also formed of stainless steel is supported at roller bearing 18 by stand 19. Spherical brass joint 20 makes rotatable but air tight contact with glass adaptor 21, tension springs 22 and 23 holding the adaptor 21 to stand 19 with any desired resilient force. A stoppered reflux condenser 24 may be joined to adaptor 21 with an outlet 25 comprising an exit for gases being led from the system. The free end of adapter 21 is closed by stopper 26 through which is inserted thermocouple well 27 and gas inlet tube 28. Air motor 14 is held at pivot 29 to stand 30. This stand 30 is rigidly fastened to base plate 31 at a predetermined distance from stand 19. Furnace 32 is supported on base plate 31 and surrounds reactor 10, holes being left in the furnace to admit passage therethrough of shaft 13 and tube 17. Furnace 32 may be made of any convenient heat resistant material. If however discrete units such as magnesia firebricks are utilized, the furnace may be easily assembled and disassembled. Heat may be supplied to the reactor 10 from any convenient source such as a small flame (not shown) playing into the furnace 32.

The operation of the ball mill can be easily understood from the description. In practice the solid reactants, admixed with the desired proportion of catalyst, were charged into the reactor and the entire system evacuated and subsequently filled with nitrogen, at atmospheric pressure, through inlet tube 17. Bubblers and a Dry Ice trap (not shown) were arranged after the exit for gases to ensure that no oxygen or moisture leaked back into the apparatus. The reactor was heated until the reaction was believed complete, the furnace was dismantled and the product removed. Swinging the ball mill downward by means of pivot 29 may be utilized to expedite removal of the solids if desired.

Further details of the invention will be more easily understood from consideration of the specific examples following.

*Example 1*

A run was made by reacting sodium hydride with boric anhydride in the presence of sodium methoxide as a catalyst. A charge of 24 g. NaH (1.0 gram mole), 34.8 g. $B_2O_3$ (0.50 gram mole) and 8.15 g. $NaOCH_3$ (0.15 gram mole) were placed in the nitrogen filled ball mill containing ¾" steel balls. The mole ratio of NaH to $B_2O_3$ was in the stoichiometric proportion of 2:1 as required by the reaction equation. The mole ratio of catalyst to sodium hydride was 0.15:1. The boric anhydride used in this example was prepared by fusing $H_3BO_3$ at atmospheric pressure in a platinum dish.

The weighed reaction charge was milled for about 50 minutes to mix and comminute the solids thoroughly. Heating was begun and continued for about 3½ hours, a mean temperature of 350° C. being maintained. At the end of this period the reactor was cooled and the contents analyzed. Analysis revealed 11.5% NaH and 7.0%

NaBH₄ present in the product. The borohydride value corresponded to a 49.5% yield of this material.

The same type of analysis was employed throughout these experiments. Both hydride and borohydride were determined by evolution of hydrogen in the Edwards analyzer, a conventional apparatus for hydride analysis described in "The Analyst," 71, 521 (1946). The method was checked by known samples made up from commercial material. Methyl Cellosolve, 2-methoxyethanol, was added in the analyzer to a sample taken from the product of the run, reacting upon the hydride with evolution of hydrogen but not reacting upon the borohydride. Acidified methyl Cellosolve was then utilized to evolve hydrogen from the borohydride. The two volumes of hydrogen produced were measured by pressure changes within the Edwards analyzer.

*Example 2*

A charge consisting of the same weight of same ingredients as were utilized in the first example was placed in the reactor. The boric anhydride of this and succeeding runs was prepared by dehydration of boric acid in vacuo as outlined in Ber. 51, 565–657 (1923). The production of borohydride was carried out in three stages after preliminary milling of the material.

(a) The reactor was held at a temperature of 250°–290° C. for 3½ hours. Analysis of a sample of product showed a borohydride yield of 29.7% of the theoretical.

(b) The reactor was held at a temperature of between 312–348° C. for an additional ½ hour. Analysis of a second sample showed a borohydride yield of 49.6% of the theoretical.

(c) The temperature of the reactor was raised to between 330–352° for 1½ hours. Yield of borohydride was increased to 64.4%.

Thus during a period of 5½ hours 64.4% conversion was effected.

*Example 3*

An additional run was made using a mole ratio of B₂O₃ to NaH of 1:1 mixed with NaOCH₃ catalyst in the ratio NaOCH₃:NaH of 0.25:1. After 3.2 hours at a temperature within the range 275–310° C., with one temporary surge to 325° C., a yield of 56% NaBH₄ was obtained.

*Example 4*

The procedure of the previous experiments was repeated using a mole ratio of B₂O₃:NaH of 1:1 and a mole ratio of NaOCH₃:NaH of 0.25:1. The reaction mix was agitated for 3¼ hours at a temperature within the range 220–245° C. A yield of 22% sodium borohydride was obtained.

*Example 5*

The reaction of pure calcium hydride with boric oxide was carried out both in the presence and in the absence of calcium methoxide. The calcium hydride utilized was commercial material of 95% purity. In order to ensure that complete reaction was obtained, the calcium hydride was ground in the ball mill then passed through a 40 mesh screen, all operations involving the hydride being carried out in a nitrogen atmosphere. Calcium methoxide was prepared by reacting metallic calcium with a large excess of methanol. The methanol was refluxed and the excess finally distilled off in vacuo. The residue was then dried in vacuo at 60° C.

A run was made following the general procedure of the previous examples and using 1 mole of CaH₂ to 1.1 moles B₂O₃. Reaction of the mixture made up from these materials for 4 hours at a mean temperature of 310° C. gave a product with no enhanced reducing power attributable to calcium borohydride. Four hours more heating at 324°–382° C. produced identical results. A further reaction time of 4½ hours at 382°–436° C. gave a product with the equivalent to a 1.3% Ca(BH₄)₂ yield. An additional 3 hour period of heating at 426–483° C. gave a product with the equivalent of a 5.5% calcium borohydride yield. The reaction shown here is claimed in my copending application Serial No. 285,771 filed of even date herewith.

A mixture similar to the foregoing was made up using the same amounts of CaH₂ and B₂O₃ but containing additionally 0.25 mole Ca(OCH₃)₂. In four hours of heating at 335–348° C., a product corresponding to a 4.5% yield of calcium borohydride was obtained. Additional heating at 328–402° C., mean temperature 400° C., gave a yield corresponding to 17.8% borohydride. Raising the temperature to a mean of 425° C. lowered the yield to 14.9% in three hours heating time.

In analysis of the calcium borohydride mixtures methyl Cellosolve was found to react too slowly. Water and acidified water were consequently substituted for the methyl Cellosolve and the analyses carried out as before.

It will be seen from the examples given above that several unexpected and beneficial results have been found in reactions between hydrides and boric oxide utilizing alkoxide catalysts. In the first place, the temperature required to give yields has been markedly lowered. While temperatures between 200–250° can actually be utilized for production of sodium borohydride, a more satisfactory range extends between about 250°–300° C. (Example 3). Good results may be obtained up to about 350° C. Calcium borohydride requires a somewhat higher temperature, 400° C. In addition to the lowering of the temperature it has proved possible to carry out the reaction in ferrous metal containers without regard to the mode of preparation of the boric oxide. Finally the time required to produce yields has been decreased to within commercially satisfactory limits. These benefits show accomplishment of the objects of the invention.

The crude sodium reaction product initially obtained is mixed with NaH, NaOCH₃ and side products. The original mixture may be employed directly as a reducing agent or it may be concentrated and purified as desired. Extraction with isopropyl amine in a Soxhlet extractor may be employed and the solid residue left upon evaporation of the amine treated with absolute ethyl alcohol to effect further purification. The calcium borohydride was found to be insoluble in isopropyl amine and no method for purifying it was developed.

Various modifications within the scope of this invention will be evident to those skilled in the chemical art. Nitrogen has been shown as the protective atmosphere used to exclude air and moisture from the reactive hydrides. Hydrogen may be used to replace nitrogen and may actually drive the reaction further towards completion. It was noted that some hydrogen was always lost from the mixed hydrides in the reactor. Truly inert gases such as helium, argon, and neon may also be substituted for the nitrogen.

Again, the invention need not be restricted to sodium and calcium alone. Other alkali and alkaline earth metals may be used as replacements for these metals. Accordingly the hydrides of such metals as lithium, potassium, barium and strontium may be substituted for calcium or sodium hydride. It may be pointed out that the positive ion of the catalyst should correspond to that of the reactant hydride employed. As exemplified NaOCH₃ was used with NaH and Ca(OCH₃)₂ with CaH₂. A lithium alkoxide should therefore preferably be utilized with LiH and a barium alkoxide with BaH₂.

The invention is furthermore not restricted to methoxide catalysts. Other alkoxides are acceptable substitutes. These alkoxides include compounds such as NaOC₂H₅, NaOC₃H₇ and other simple alcoholates. In addition the phenates such as NaOC₆H₅ are available. A general formula for a desirable catalyst may be written as $M(OR)_x$ where M represents an alkali or alkaline earth ion, R stands for an alkyl radical of fairly low molecular weight, that is, with a carbon chain of up to about five or six atoms long, or a simple aryl radical of the phenyl type and $x$ is the valence of the positive ion of the catalyst. Since acids liberate hydrogen from borohydrides, the alkoxide chosen should in general be alkaline in nature. The amount of catalyst employed can also be varied as is evident from the examples. A mole ratio of 0.15:1 NaOCH$_3$:NaH has been shown as effective. Up to 0.25:1 gives still improved results but the improvement is not directly proportional to the increase in catalyst. A ratio of up to at least 0.30:1 would however be acceptable and even larger amounts of catalyst could be employed. In addition the ratio of catalyst will vary somewhat with both the hydride and the alkoxide used. Still other changes in procedure may be made without departing from the spirit of the invention.

In some of the following claims the term "catalytic amount" is utilized. This term is not to be understood here as denoting the extremely small quantities sometimes represented by such an expression. It refers rather to quantities sufficient to promote the desired reaction, quantities which will, in most instances, amount to an appreciable fraction of the metallic hydride employed. The term furthermore does not imply that any particular theory of the mode of operation of the alkoxide is endorsed.

Having now described my invention,

I claim:

1. The process of producing the borohydride of a metal of the group consisting of the alkali and alkaline earth metals which comprises reacting the hydride of said metal with boric anhydride at around 200–350° C. in the presence of a catalytic amount of an alkoxide of said metal, said alkoxide having the general formula $M(OR)_x$ where M represents the metal, R is an organic radical chosen from the group consisting of alkyl radicals possessing a chain length of between one and six carbon atoms and the phenyl radical, and $x$ is the valence of the metal M.

2. The process of claim 1 characterized in that the alkoxide of said metal is the methoxide.

3. The process of claim 1 carried out in the substantial absence of air and moisture and at a temperature of 250–300° C.

4. The process of claim 3 characterized in that the hydride, the boric anhydride and the alkoxide are comminuted, thoroughly mixed together and agitated during the heating.

5. The process of claim 4 carried out in a reaction vessel made from ferrous metal.

6. The process of claim 5 in which the reaction vessel is a stainless steel ball mill.

7. The process of making sodium borohydride which comprises heating sodium hydride with boric anhydride to a temperature of about 200°–350° C. in the presence of a catalytic amount of a sodium alcoholate possessing a straight carbon chain containing up to six carbon atoms.

8. The process of claim 7 characterized in that the sodium alcoholate is sodium methoxide.

9. The process of making sodium borohydride which comprises heating sodium hydride and boric anhydride in a mole ratio of about 2:1 together with a sodium alcoholate present in a mole ratio with the hydride of not greater than about 0.25:1, said alcoholate possessing a straight carbon chain containing up to six carbon atoms.

10. The process of claim 9 in which the alcoholate is sodium methoxide.

11. The process of making sodium borohydride which comprises heating together sodium hydride, boric anhydride and sodium methoxide in a mole ratio of about 2:1:0.5 at a temperature of between about 200° and 350° C. and in the presence of a relatively inert atmosphere.

12. The method of making sodium borohydride which comprises heating together with agitation comminuted sodium hydride, boric anhydride and sodium methoxide, in a mole ratio of 2:1:0.5, at a temperature between about 250° and 300° C.

13. The method of claim 12 carried out in a stainless steel reactor.

14. The method of making calcium borohydride which comprises heating together at a temperature of between about 350° and 450° C. comminuted agitated calcium hydride, boric anhydride and calcium methoxide in a mole ratio of about 1:1:0.25.

References Cited in the file of this patent

UNITED STATES PATENTS

| 2,465,989 | Sowa | Apr. 5, 1949 |
| 2,534,533 | Schlesinger | Dec. 19, 1950 |
| 2,596,690 | Hurd | May 13, 1952 |

FOREIGN PATENTS

| 373,469 | Great Britain | Aug. 12, 1932 |

OTHER REFERENCES

Swamer et al., "Journal of the American Chemical Society," vol. 72, page 1355, March 1950.

Lucas, "Organic Chemistry," American Book Co., 1935, page 123.